April 18, 1950     L. A. PARADISE     2,504,723

COTTON PICKER SPINDLE

Filed Aug. 28, 1948

INVENTOR.
L. A. PARADISE

ATTORNEYS

Patented Apr. 18, 1950

2,504,723

UNITED STATES PATENT OFFICE 2,504,723

COTTON PICKER SPINDLE

Louis A. Paradise, Rock Island, Ill., assignor to Deere & Company, Moline, Ill., a corporation of Illinois Application August 28, 1948, Serial No. 46,685

14 Claims. (Cl. 56—50)

This invention relates to improvements in cotton picker spindles for mechanical cotton pickers, particularly cotton pickers of the type in which a plurality of rotating barbed spindles are introduced into the plants to remove the cotton therefrom.

A typical cotton picker of the type referred to comprises a drum or assembly having a plurality of vertical picker bars from each of which a plurality of rotatable picker spindles extend horizontally. Each spindle is elongated and is rotatable about its principal axis, being provided with teeth or barbs to engage the cotton. The spindles rotate at a relatively high speed and the cotton is wrapped around the spindles, after which the spindles are withdrawn from the plants and caused to move through doffing mechanism which doffs or wipes the cotton therefrom. The usual doffing mechanism includes a plurality of doffers, equal in number to the number of spindles on each picker bar, and each doffer comprises a generally circular plate having appropriate cotton-removing means thereon, such as rubber pads or brushes or a combination of both.

A large part of the efficiency of any mechanical cotton picker of the type referred to depends upon the picking capacity of the spindles and the ability of the spindles to be easily doffed. One of the factors affecting the picking efficiency and doffability of a spindle is the disposition of the teeth on the spindles. Other factors are the shape of the teeth, the inclination or angularity of the teeth and the relationship of the teeth to untoothed portions of the spindle. In general, a suitable spindle will have an elongated conical body rotatable about its principal axis and having this axis arranged at such an angle to the horizontal that the elements of the cone will be caused to pass through the horizontal plane in which the associated doffer rotates. If the spindle is cylindrical rather than conical, its axis of rotation may be horizontal, whereupon the elements of the cylindrical surface will rotate through said horizontal plane. In either case, the arrangement is such as to facilitate mounting of the doffers for rotation about a vertical axis. In a typical design of tapered or conical spindle, the periphery of the spindle is provided with alternate flutes and lands running lengthwise of the spindle, the lands being curved portions on the conical surface of the spindle and the flutes being relieved or flattened so that they lie radially inwardly of the lands. The teeth are provided on the flutes and project generally radially therefrom and have their points on or within the conical surface continued through the lands. The teeth may be inclined or undercut somewhat in the direction of rotation of the spindle, for the purpose of rendering the teeth more aggressive in the engaging of cotton. The teeth may further be inclined toward the tapered end or apex of the spindle, for the purpose of facilitating doffing, since the spindles pass beneath the doffers in a path in which the row of teeth is substantially tangent to a circle formed about the axis of rotation of the doffers.

From the foregoing, it will be seen that the design of an efficient picker spindle involves several considerations and that variations in the teeth to increase or decrease picking aggressiveness thereof may easily affect the doffing characteristics thereof. In spindles heretofore known, the picking teeth have been arranged in a row that lies on a straight line coincident with the lengthwise center line of the flute. Such arrangement gives the maximum length of teeth as measured radially from the surface of the flute to the peripheral surface that includes the lands. The disposition of the teeth along the lengthwise center line of the flute places the points of the teeth equidistant from the edges or sides of the flute adjoining the lands that are separated by that flute.

According to the present invention, it is a principal object to arrange the teeth in a row that is non-parallel or non-coincident with the lengthwise center line of the flute, thereby positioning certain of the teeth at progressively increasing distances from one side of the flute that adjoins the land at that side, the line along which said flute adjoins said land constituting a leading edge as respects the direction of rotation of the spindle. Thus there is achieved an increase in the ability of the teeth to pick cotton, which increase does not detract from the doffing characteristics of the spindle. In the case of a tapered or conical spindle, the flute will be accordingly tapered and the non-coincidence of the row of teeth with respect to the lengthwise center line of the flute will increase the non-parallelism of the row of teeth with respect to the leading edge of the flute and will bring the row of teeth in parallelism with or more nearly in parallelism with the trailing edge of the flute, which edge is formed by the junction between the trailing side of the flute and the succeeding land. The importance of the arrangement of the teeth with respect to the lands is brought out by the fact that the lands are at greater radial distances from the rotating axis of the spindle than are the flutes, so that, during rotation of the spindle, the lands have a tendency to brush the cotton aside. If the interval between the leading edge of the flute and the tooth is increased, there is an increased space for the cotton to pass over the land and back into the path of the teeth. However, if the tooth is removed completely to the trailing edge of the flute, its height or length is decreased, since the point thereof must be maintained on or within the peripheral surface including the lands. According to the present invention, it is found that those teeth adjacent the base of the cone of the spindle may be set slightly toward the trailing edge of the flute, with the result that, although the length of the tooth is somewhat decreased, the picking efficiency of the spindle is materially increased.

Another object of the invention is to provide an improved spindle construction in which the teeth are formed on a ridge extending lengthwise of the flute. Spindles of this type are ordinarily finished by grinding and it is desired that transverse grinding of the flute portion to provide the teeth does not result in grinding the flute surface itself, it being important that all exposed surfaces except the points of the teeth be kept as smooth as possible.

The foregoing and other important objects and desirable features inherent in and encompassed by the invention will become apparent to those versed in the art as a complete disclosure is made of a preferred embodiment of the invention in the following detailed description and accompanying sheet of drawings, in which Figure 1 is an enlarged elevational view of the improved spindle, the scale of the drawing being substantially twice that of an actual spindle;

The spindle shown comprises an elongated body of conical shape, designated generally by the letter C, which tapers from a base B to a tip T. The spindle is mounted in any appropriate manner at its base end for rotation about its longitudinal or principal axis AA and is thus arranged to extend outwardly for introduction into plants.

The peripheral surface of the spindle is provided with a plurality of peripheral or external surface portions in the form of alternate lands L and flutes F arranged about the principal axis AA. In the spindle illustrated, there are three lands and three flutes so that in cross-sectional appearance, as in Figures 2, 3 and 4, the spindle body has generally the form of a regular polygon formed about the axis AA and having sides provided by the flutes F and rounded corners provided by the lands L. The lands lie on the conical surface of the spindle; stated otherwise and considering the spindle in cross section, the lands L are on a circle circumscribing the polygon and formed about the axis AA. As indicated in Figure 2, the flutes are radially inwardly of the circle on which the lands lie and, being flat, the flutes are, in effect, chords of this circle.

It should be understood that the spindle illustrated is of a general type having its structural characteristics determined according to particular requirements. Under other conditions and in other circumstances, the spindle could well have a greater or smaller number of lands and flutes. Similarly, the flutes need not be flat but could have other surfaces, such as the concave surface of the spindle shown in the United States patent to Morava 1,668,247.

The flutes and lands run lengthwise of the peripheral surface of the spindle and, inasmuch as the spindle tapers from its base to its tip, the flutes and lands likewise taper accordingly. Each is therefore wider at its base end than at its tip end. If the spindle were cylindrical, or more nearly cylindrical than shown, the sides or the edges of the flutes and lands would be parallel or more nearly parallel. The manner in which the flutes and lands are formed is relatively immaterial. In a preferred process, the spindle would be rough-finished to substantially its desired conical shape and peripheral portions thereof would be relieved, as by grinding, to provide the flutes, allowing for the provision of picking means on each flute comprising a row of picking teeth P. The teeth are in a row along a line formed by a relatively low ridge R which projects a slight distance—for example, .004 inch—from a flute F. The picking teeth P are preferably formed by grinding at the angle shown and to a depth determined by the ridge R, the ridge serving as a limit to define the bottom of the teeth so that the grinding wheel or wheels do not mar the flat surface of the flute F.

Figure 2:
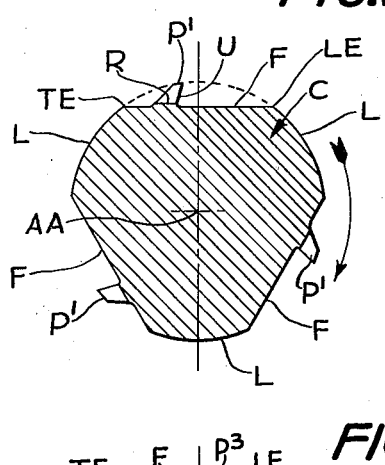
Figure 2 is an enlarged transverse sectional view taken substantially on the line 2—2 of Figure 1.
Figure 3:
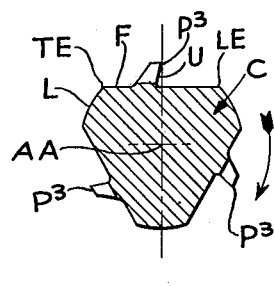
Figure 3 is a transverse sectional view taken on the line 3—3 of Figure 1.
Figure 4:
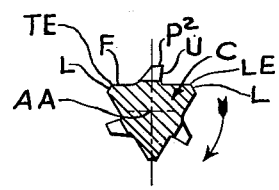
Figure 4 is a transverse sectional view taken on the line 4—4 of Figure 1, Figures 2, 3 and 4 being drawn to a scale substantially twice that of Figure 1.

As best shown in Figures 2, 3 and 4, each tooth extends generally radially outwardly from the particular flute F so that its point lies on or within the circle that includes the lands L. Thus, the circle referred to determines the height of the teeth. Appropriate arrows on the drawing show the direction of rotation of the particular spindle illustrated. Having reference to the direction of rotation, each flute F adjoins one land L in a leading edge LE and adjoins a following land in a trailing edge TE. In the instance illustrated, each edge lies substantially along a straight line and the edges converge from base to tip of the spindle. The lengthwise center line of the flute is included in a plane passed lengthwise through the spindle and including the axis of rotation AA. In other words, at any selected point along the lengthwise center line of the flute F, the leading edge and the trailing edge are equidistant from the center line.

In spindles of prior known constructions, the row of picking teeth lay along the lengthwise center line of the flute. According to the present invention, the ridge R on which the row of teeth is formed is inclined or at an angle to the lengthwise center line, the offset at the base end of the spindle being readily apparent at O. Further, a line running lengthwise through the points of the teeth P crosses or intersects the plane through the axis AA and through the lengthwise center line of the flute, so that the first tooth at the base end of the spindle, designated at $P^1$, is to the trailing side of the lengthwise center line of the flute and the outermost or tip tooth, designated at $P^2$, leads the lengthwise center line of the flute. This arrangement will be further apparent from an examination of Figures 2 and 4.

As is customary, the teeth P may be undercut at their leading edges, as at U, which undercut is of slight degree, as, for example, eight degrees. Further, as is customary, the teeth incline not only in the direction of rotation by virtue of the undercut at U, but are also inclined from base to tip, the angle of inclination being preferably approximately forty-five degrees.

As shown in Figure 3, at the particular section illustrated, the teeth in the plane of that section, designated at P³, have their points substantially coincident with the longitudinal center lines of the respective flutes. Hence, the drawings emphasize the intersection of the line of the teeth with the plane through and including the axis of rotation AA and the lengthwise center line of the particular flute.

Figure 1:
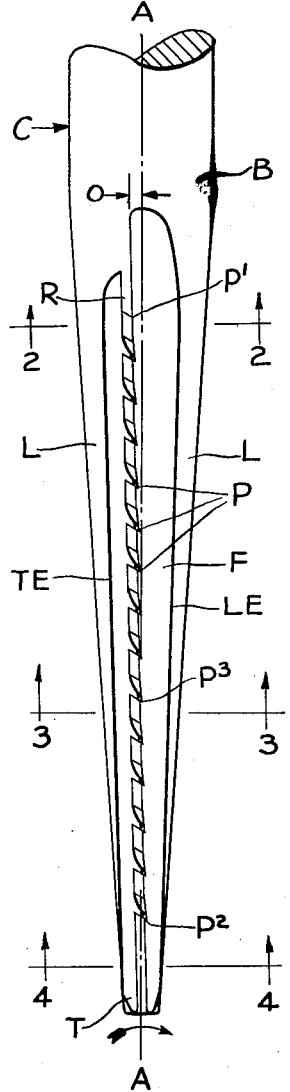

The illustration in Figure 1 brings out that the row of teeth is clearly in pronounced non-parallelism with the leading edge LE, whereas the row of teeth is substantially or more nearly in parallelism with the trailing edge TE. In other words, the row of teeth is substantially equidistant from the trailing edge TE throughout its length, whereas the teeth are disposed at progressively increasing distances from the leading edge LE as measured circumferentially (or transverse to the axis AA) from LE to P, this distance increasing from the tip to the base of the spindle. As will be apparent from Figure 2, the disposition of the tooth P¹ behind the lengthwise center line of the flute F increases the distance between the point of that tooth and the leading edge LE. Thus, the arrangement increases the space between the land and the row of teeth so that the entry of cotton into the path of the teeth is facilitated; that is to say, the time interval between engagement of the land with the cotton and engagement of the teeth with the cotton is increased and there is minimized or eliminated entirely the possibility that the land will engage the cotton in such manner as to brush it completely out of the path of the teeth. The relationship of the tooth P¹ to the leading edge LE, for example, is brought out to varying degrees throughout the length of the row of teeth, although this factor disappears as the row of teeth cross the center line of the flute. However, as the teeth progress toward the tip of the spindle, the land L tapers in the same direction, so that the surface of the land at the tip end of the spindle is considerably smaller than the land surface at the base of the spindle. Hence, the effect of the land at the tip end of the spindle is not as pronounced as at the base end of the spindle. Therefore, the teeth toward the tip end of the spindle can be brought more closely to the longitudinal center line of the flute and thereby increase the height of the teeth. This will be apparent upon recalling that the height of the teeth is determined by the circle which includes the lands, and further from the fact that the optimum greatest height of tooth is directly on the plane that includes the axis of rotation AA and the lengthwise center line of the flute.

The application of the principles of the invention is not limited to a spindle of the tapered type, nor to a spindle having flat flutes. As mentioned above, any number of lands and flutes may be used; likewise, the flutes may be of any configuration; and it is contemplated that the principles of the invention will be readily applicable to a spindle of the type in which the flutes are spirally arranged, as in the U. S. patent to Johnston, 2,292,945. In that case, the row of teeth is symmetrical with the edges of a particular flute and hence would not have the characteristics set forth herein. However, in view of the instant disclosure, the suggested modifications will be obvious.

Various other features and desirable characteristics not specifically enumerated above will undoubtedly occur to those skilled in the art, as will various modifications and alterations in the detailed design illustrated, all of which may be accomplished without departing from the spirit and scope of the invention as defined in the appended claims.

What is claimed is:

1. A cotton picker spindle comprising an elongated tapered body generally in the form of a cone rotatable about its principal axis and having its periphery formed with a plurality of alternate lands and flutes running generally lengthwise of the body and tapering from base to tip of the cone and spaced circumferentially about said axis so that the body in cross section is generally in the form of a regular polygon with the lands providing rounded corners thereon and lying on a circle that is formed about said principal axis and that circumscribes the polygon, the flutes representing chords of said circle and being therefore disposed radially inwardly of said circle, each flute adjoining adjacent lands at each side thereof in substantially straight lines that converge generally lengthwise of the body from base to tip, one line providing a leading edge and the other a trailing edge as respects the direction of rotation of the spindle; and a plurality of rows of picking teeth on the body, one row for each flute, each row lying along a substantially straight line inclining lengthwise and circumferentially away from the respective leading edge so as to be convergent with the said leading edge and generally parallel to the respective trailing edge.

2. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute and arranged so that in a cross-section of the body the land portions lie on a circle about said principal axis of the body and the flute is radially inwardly of said circle; and a row of picking teeth on the body arranged in a line that runs generally lengthwise along the flute and that is convergent with the lengthwise center line of the flute.

3. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute and arranged so that in a cross-section of the body the land portions lie on a circle about said principal axis of the body and the flute is radially inwardly of said circle; and a plurality of picking teeth on the body arranged generally lengthwise along the flute at progressively increasing circumferential distances from the lengthwise center line of the flute from one end of the flute to the other.

4. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute and arranged so that in a cross-section of the body the land portions lie on a circle about said principal axis of the body and the flute is radially inwardly of said circle; and a plurality of picking teeth on the body arranged generally lengthwise along the flute and disposed so that certain of the teeth are at circumferentially greater distances than other teeth from the lengthwise center line of the flute.

5. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute and arranged so that in a cross-section of the body the land portions lie on a circle about said principal axis of the body and the flute is radially inwardly of said circle; said flute being tapered from one end of the body to the other so that it is wider in transverse dimension at one end than at the other, the junction of the flute at one side thereof with one land portion providing a lengthwise leading edge and the junction of the flute at its other side with another land portion providing a lengthwise trailing edge as respects the direction of rotation of the spindle, said leading edge and trailing edge converging from one end of the flute to the other because of the aforesaid taper on the flute; and a plurality of picking teeth on the body arranged generally lengthwise along the flute in a row that is parallel to one of said edges and convergent with the other of said edges.

6. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute and arranged so that in a cross-section of the body the land portions lie on a circle about said principal axis of the body and the flute is radially inwardly of said circle; said flute being tapered from one end of the body to the other so that it is wider in transverse dimension at one end than at the other, the junction of the flute at one side thereof with one land portion providing a lengthwise leading edge and the junction of the flute at its other side with another land portion providing a lengthwise trailing edge as respects the direction of rotation of the spindle, said leading edge and trailing edge converging from one end of the flute to the other because of the aforesaid taper on the flute; and a row of picking teeth on the body arranged generally lengthwise of the flute in a line substantially uniformly spaced from said trailing edge and progressively increasingly spaced from said leading edge.

7. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute and arranged so that in a cross-section of the body the land portions lie on a circle about said principal axis of the body and the flute is radially inwardly of said circle; a ridge integral with and running generally lengthwise of the flute along a line in convergent relation to the lengthwise centerline of the flute; and a plurality of picking teeth carried by the ridge and projecting radially outwardly therefrom.

8. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute and arranged so that in a cross-section of the body the land portions lie on a circle about said principal axis of the body and the flute is radially inwardly of said circle; a ridge integral with and running generally lengthwise of the flute; and a plurality of picking teeth carried by the ridge and projecting radially outwardly therefrom and generally circumferentially of the body to provide picking points in alignment generally lengthwise of the flute along a line in convergent relation to the lengthwise centerline of the flute.

9. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute and arranged so that in cross-section of the body the land portions lie on a circle about said principal axis of the body and the flute is radially inwardly of said circle; said flute being tapered from one end of the body to the other so that it is wider in transverse dimension at one end than at the other; the junction of the flute at one side thereof with one land portion providing a lengthwise leading edge and the junction of the flute at its other side with another land portion providing a lengthwise trailing edge as respects the direction of rotation of the spindle, said leading edge and trailing edge converging from one end of the flute to the other because of the aforesaid taper on the flute; a ridge integral with and running generally lengthwise of the flute along a line that is parallel to said trailing edge and convergent with said leading edge; and a plurality of picking teeth carried by the ridge and projecting radially outwardly therefrom.

10. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute and arranged so that in a cross-section of the body the land portions lie on a circle about said principal axis of the body and the flute is radially inwardly of said circle; said flute being tapered from one end of the body to the other so that it is wider in transverse dimension at one end than at the other, the junction of the flute at one side thereof with one land portion providing a lengthwise leading edge and the junction of the flute at its other side with another land portion providing a lengthwise trailing edge as respects the direction of rotation of the spindle, said leading edge and trailing edge converging from one end of the flute to the other because of the aforesaid taper on the flute; a ridge integral with and running generally lengthwise of the flute; and a plurality of picking teeth carried by the ridge and projecting radially outwardly therefrom and generally circumferentially of the body to provide picking points in alignment generally lengthwise of the flute along a line that is parallel to the trailing edge and convergent with the leading edge.

11. A cotton picker spindle comprising an elongated body adapted for rotation about its principal axis and having a plurality of outer surface portions running lengthwise of the body and arranged about said axis and providing a flute flanked on each side by a land; and picking means on the body confined within the area of the flute and arranged in a line that runs generally lengthwise along the flute and that is convergent with the lengthwise centerline of the flute.

12. A cotton picker spindle comprising an elongated generally conical body rotatable about its principal axis and including a base and a tip and having a plurality of outer surface portions running lengthwise of the body and arranged about said axis and providing a flute flanked at each side by a land, the sides of said flute converging from base to tip generally in accord with the conical shape of the body; and picking means carried by and confined within the area of the flute substantially along a line that runs lengthwise of the flute and that is convergent with the lengthwise centerline of the flute.

13. A cotton picker spindle comprising an elongated body adapted for rotation about its principal axis and having a plurality of outer surface portions running lengthwise of the body and arranged about said axis and providing a flute flanked on each side by a land; and picking means on the body confined within the area of the flute and arranged in a line that runs generally lengthwise along the flute and that intersects the lengthwise centerline of the flute.

14. A cotton picker spindle comprising an elongated body rotatable about its principal axis and having its periphery provided with a plurality of portions running lengthwise thereof, one of said portions constituting a flute and other portions constituting lands, one land being disposed at each side of and adjoining the flute, and arranged so that in a cross-section of the body the land portions lie on a circle about said principal axis of the body and the flute is radially inwardly of said circle; and a row of picking teeth on the body arranged in a line that runs generally lengthwise along the flute and that intersects the lengthwise centerline of the flute.

LOUIS A. PARADISE.

REFERENCES CITED

The following references are of record in the file of this patent:

UNITED STATES PATENTS

| Number | Name | Date |
|---|---|---|
| 908,638 | Appleby | Jan. 5, 1909 |
| 2,290,222 | Barbknecht | July 21, 1942 |